United States Patent
Hasberg et al.

(10) Patent No.: US 11,163,041 B2
(45) Date of Patent: Nov. 2, 2021

(54) METHOD AND DEVICE FOR DETERMINING AN EXACT POSITION OF A VEHICLE WITH THE AID OF RADAR SIGNATURES OF THE VEHICLE SURROUNDINGS

(71) Applicant: Robert Bosch GmbH, Stuttgart (DE)

(72) Inventors: Carsten Hasberg, Isfeld-Auenstein (DE); Christoph Schroeder, Sunnyvale, CA (US); Danny Hiendriana, Ludwigsburg (DE); Oliver Pink, Ditzingen (DE); Philipp Rasp, Wannweil (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 16/347,488

(22) PCT Filed: Oct. 23, 2017

(86) PCT No.: PCT/EP2017/076980
§ 371 (c)(1),
(2) Date: May 3, 2019

(87) PCT Pub. No.: WO2018/095669
PCT Pub. Date: May 31, 2018

(65) Prior Publication Data
US 2019/0285419 A1    Sep. 19, 2019

(30) Foreign Application Priority Data
Nov. 28, 2016 (DE) .................. 102016223526.5

(51) Int. Cl.
*G01S 7/41* (2006.01)
*G01C 21/30* (2006.01)
(Continued)

(52) U.S. Cl.
CPC .............. *G01S 7/412* (2013.01); *G01C 21/30* (2013.01); *G01S 5/14* (2013.01); *G01S 7/41* (2013.01);
(Continued)

(58) Field of Classification Search
CPC .......... G01S 7/412; G01S 7/41; G01S 13/874; G01S 13/876; G01S 13/931;
(Continued)

(56) References Cited

U.S. PATENT DOCUMENTS

2008/0243378 A1* 10/2008 Zavoli .................... G01C 21/28
701/533
2012/0271540 A1* 10/2012 Miksa ................... B60W 30/12
701/409
(Continued)

FOREIGN PATENT DOCUMENTS

DE      102014214391 A1    1/2016
DE    10 2015 002 155 A1    8/2016
(Continued)

OTHER PUBLICATIONS

International Search Report for PCT/EP2017/076980, dated Feb. 13, 2018.

*Primary Examiner* — Donald H B Braswell
(74) *Attorney, Agent, or Firm* — Norton Rose Fulbright US LLP; Gerard Messina

(57) ABSTRACT

A method and device for determining a first highly precise position of a vehicle. The method includes acquiring surrounding-area data values using at least one radar sensor of the vehicle, the surrounding-area data values representing a surrounding area of the vehicle; and determining a rough position of the vehicle as a function of the acquired surrounding area data values. In addition, the method includes determining surrounding-area feature data values as a func-
(Continued)

tion of the determined rough position of the vehicle, the surrounding-area feature data values representing at least one surrounding-area feature and a second highly precise position of the at least one surrounding-area feature; and determining the first highly precise position of the vehicle as a function of the at least one surrounding-area feature, according to predefined localization criteria, the first highly precise position of the vehicle being more precise than the rough position of the vehicle.

6 Claims, 3 Drawing Sheets

(51) Int. Cl.
*G01S 13/87* (2006.01)
*G01S 13/931* (2020.01)
*G01S 5/14* (2006.01)
*G01S 13/89* (2006.01)

(52) U.S. Cl.
CPC .......... *G01S 13/874* (2013.01); *G01S 13/876* (2013.01); *G01S 13/931* (2013.01); *G01S 13/89* (2013.01); *G01S 2013/93271* (2020.01); *G01S 2013/93272* (2020.01)

(58) Field of Classification Search
CPC . G01S 2013/93271; G01S 2013/93272; G01S 13/89; G01C 21/30
See application file for complete search history.

(56) References Cited

U.S. PATENT DOCUMENTS

| | | | |
|---|---|---|---|
| 2013/0218448 A1* | 8/2013 | Suzuki | G06F 17/00 701/300 |
| 2016/0069985 A1* | 3/2016 | Kwakkernaat | G01S 13/751 342/146 |
| 2016/0320482 A1 | 11/2016 | Ling | |
| 2017/0305420 A1* | 10/2017 | Desens | G05D 1/0238 |

FOREIGN PATENT DOCUMENTS

| | | |
|---|---|---|
| EP | 2977788 A1 | 1/2016 |
| JP | 2005115637 A | 4/2005 |
| JP | 2007303841 A | 11/2007 |

* cited by examiner

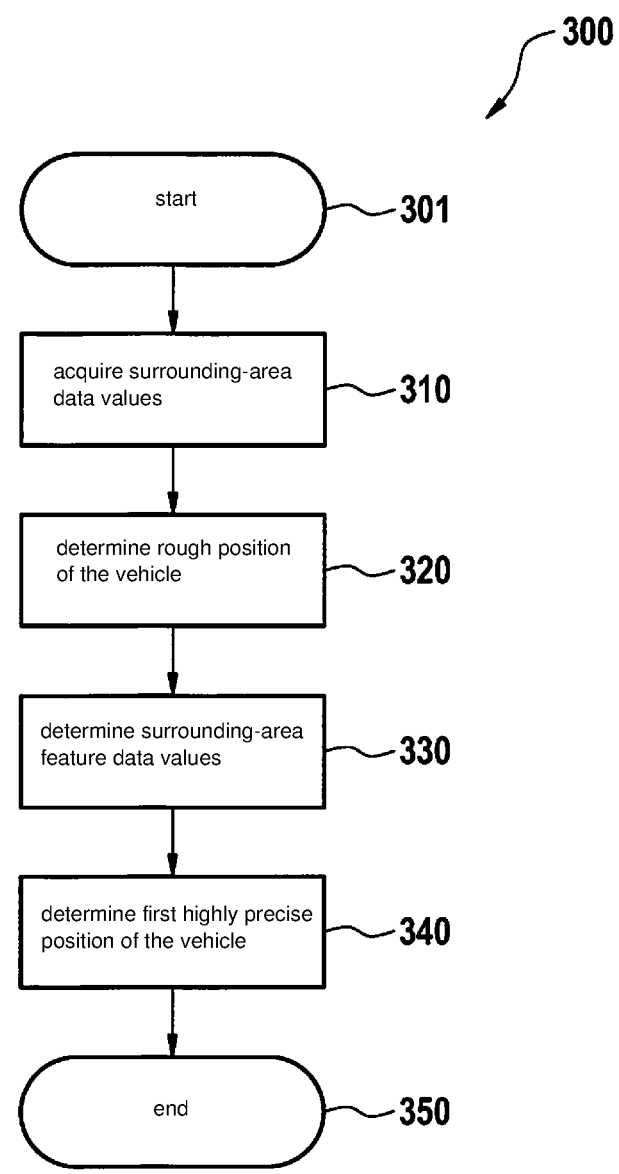

METHOD AND DEVICE FOR DETERMINING AN EXACT POSITION OF A VEHICLE WITH THE AID OF RADAR SIGNATURES OF THE VEHICLE SURROUNDINGS

FIELD

The present invention relates to a method and a device for determining a first highly precise position of a vehicle; the method including a step of acquiring surrounding-area data values, a step of determining a rough position, a step of determining surrounding-area feature data values, and a step of determining the first highly precise position.

BACKGROUND INFORMATION

German Patent Application No. DE 10 2015 002 155 A1 describes a method for ascertaining a location information item of a motor vehicle, which includes a position and/or an orientation and is in regard to an available driving corridor in the direction of travel of the motor vehicle. In this context, radar data describing the surrounding area of the motor vehicle are recorded by at least one radar sensor, and at least one stationary feature describing the boundary of the driving corridor is identified and localized in the radar data. In addition, is evaluated for ascertaining a driving corridor information item describing the driving corridor in a vehicle coordinate system; the location information item being derived from the driving corridor information item.

SUMMARY

An example method of the present invention for determining a first highly precise position of a vehicle includes, e.g., a step of acquiring surrounding-area data values, using at least one radar sensor of the vehicle, the surrounding-area data values representing a surrounding area of the vehicle; a step of determining a rough position of the vehicle as a function of the acquired surrounding-area data values; a step of determining surrounding-area feature data values as a function of the determined rough position of the vehicle, the surrounding-area feature data values representing at least one surrounding-area feature and a second highly precise position of the at least one surrounding-area feature; and a step of determining the first highly precise position of the vehicle as a function of the at least one surrounding-area feature, according to predefined localization criteria, the first highly precise position of the vehicle being more precise than the rough position of the vehicle.

In this case, a rough position of a vehicle is a position of the vehicle within a predefined coordinate system; the position being subjected to a certain amount of uncertainty. In this connection, it may be, for example, a position information item in the form of a circle; the position being assigned a center point and a radius. Through transferring the circle to a (two-dimensional) map, a rough position of the vehicle is obtained by localizing the vehicle as being situated inside of the circle. Where the vehicle is exactly located inside of the circle, is not important for the specification of the rough position. For example, the amount of uncertainty and, therefore, the radius of the circle, is on the order of approximately 5 meters. The area of the circle is typically greater than the base area of the vehicle, viewed from above.

Here, a first and/or second highly precise position denotes a position within a predefined coordinate system; the position likewise being subjected to a certain amount of uncertainty. However, the first and/or second highly precise position differs from the rough position in that, according to predefined localization criteria, the uncertainty is more exact. One example of a localization criterion is that the amount of uncertainty of the first and/or second highly precise position is less than the amount of certainty of the rough position by a predefined factor. For example, the amount of uncertainty of the first and/or second highly precise position is on the order of approximately 20-30 centimeters or less. In this context, the first highly precise position of the vehicle is assigned, for example, to a particular point of the vehicle.

In this case, a vehicle may be understood as both a manned and an unmanned vehicle. In addition, it may be a manually operated vehicle, as well as a partially, highly, or fully automated vehicle.

First of all, the example method of the present invention may have the advantage that a first highly precise position of the vehicle is determined as a function of at least one surrounding-area feature and, therefore, as a function of a possible radio link, such as in the case of a determination of position via GPS. This allows the first highly precise position of the vehicle to be determined, even if a GPS signal cannot be received due to existing surrounding-area influences, such as tall buildings or mountains. Secondly, the advantage is reflected in a position's being determined in two steps. The rough position is determined in a first step, and the highly precise position is first determined in a second step, as a function of the rough position already determined. In this manner, the highly precise position is determined, on the whole, with considerably less computational expenditure, and markedly faster, which means, for example, that the effectiveness of driver assistance functions of the vehicle and the safety of the vehicle are improved.

The rough position of the vehicle is preferably determined by comparing the surrounding-area data values at least partially to a first radar signature according to predefined, first comparison criteria.

The first highly precise position of the vehicle is preferably determined by comparing the surrounding-area data values at least partially to a second radar signature in accordance with predefined, second comparison criteria.

The first radar signature and/or the second radar signature are preferably present in the form of a radar map, which is contained by the vehicle.

The altogether radar-based method may have the advantage that, for example, in comparison with a video-based method, the method is carried out independently of lighting conditions, e.g., due to the time of day or night-time, or due to a glare from sun rays or other light sources in the vicinity of the vehicle. In addition, radar sensors already present in the vehicle may be accessed, which means that further sensors do not have to be installed.

In this case, a first and/or second radar signature are to be understood, for example, as data values, which have already been acquired in advance with the aid of a radar sensor and are stored in a storage medium in the form of a radar map, by assignment to a position. In this context, each surrounding area has a radar signature typical of it and, consequently, may be assigned to a rough position and/or to a first highly precise position, using first and/or second comparison criteria.

In this context, the acquired surrounding-area data values, which are acquired by at least one radar sensor of the vehicle, are compared to the first and/or second radar signature according to the first and/or second comparison criteria, e.g., in such a manner, that the acquired surrounding-area data values have a particular signal pattern, which must correspond to the first and/or second radar signature to a specified extent. For example, correspondence between the first and/or second radar signature and the acquired surrounding-area data values may be present, if there is at least 90% agreement between the respective data.

The surrounding-area feature data values are preferably determined so that the surrounding-area feature data values represent exactly one surrounding-area feature in such a manner, that the distance between the surrounding-area feature and the vehicle is minimal according to predefined evaluation criteria.

The distance between the surrounding-area feature and the vehicle being minimal according to predefined evaluation criteria means that, according to predefined evaluation criteria, the distance between the surrounding-area feature and the vehicle is minimal in comparison with at least one further distance between at least one further surrounding-area feature and the vehicle.

The distance between the surrounding-area feature and the vehicle being minimal according to predefined evaluation criteria, is particularly advantageous, since surrounding-area features at a shorter distance from the vehicle are more effectively and more accurately covered, which means that on the whole, the method is executed more rapidly and more effectively.

In one particularly preferred specific embodiment, the first highly precise position of the vehicle is determined in such a manner, that the first highly precise position permits operation of the vehicle, which is not possible by exclusive determination of the rough position.

This is particularly advantageous, since due to the more precise position determination and the consequently improved knowledge of the position of the vehicle, the safety of the vehicle is increased, as, e.g., distances from obstacles may consequently be determined more precisely and a collision with an obstacle may be prevented.

The rough position of the vehicle and/or the first highly precise position of the vehicle are preferably determined in such a manner, that the rough position and/or the first highly precise position include a position in a predefined coordinate system, in particular, in a GPS coordinate system.

In a particularly preferred, specific embodiment, the first highly precise position of the vehicle is determined, using the second highly precise position of the at least one surrounding-area feature as a starting point.

This is particularly advantageous, since using the second, highly precise position as a starting point, the first highly precise position may be determined rapidly and precisely, for example, by determining the relative distance and the relative speed of the vehicle with respect to the at least one surrounding-area feature, using simple vector addition, for example, on the basis of the given positions within a GPS coordinate system.

An example device of the present invention for determining a first highly precise position of a vehicle includes, e.g., first devices for acquiring surrounding-area data values, using at least one radar sensor of the vehicle, the surrounding-area data values representing a surrounding area of the vehicle; and second devices for determining a rough position of the vehicle as a function of the acquired surrounding-area data values. In addition, the device includes third devices for determining surrounding-area feature data values as a function of the determined rough position of the vehicle, the surrounding-area feature data values representing at least one surrounding-area feature and a second highly precise position of the at least one surrounding-area feature; and fourth devices for determining the first highly precise position of the vehicle as a function of the at least one surrounding-area feature, according to predefined localization criteria, the first highly precise position of the vehicle being more precise than the rough position of the vehicle.

The first devices and/or the second devices and/or the third devices and/or the fourth devices are preferably configured to implement a method according to at least one of the method claims.

Advantageous further refinements of the present invention are described herein.

BRIEF DESCRIPTION OF THE DRAWINGS

Exemplary embodiments of the present invention are represented in the figures and are explained in more detail below.

FIG. 3 shows purely illustratively, an exemplary embodiment in the form of a flow chart.

DETAILED DESCRIPTION OF EXAMPLE EMBODIMENTS

Figure 1:
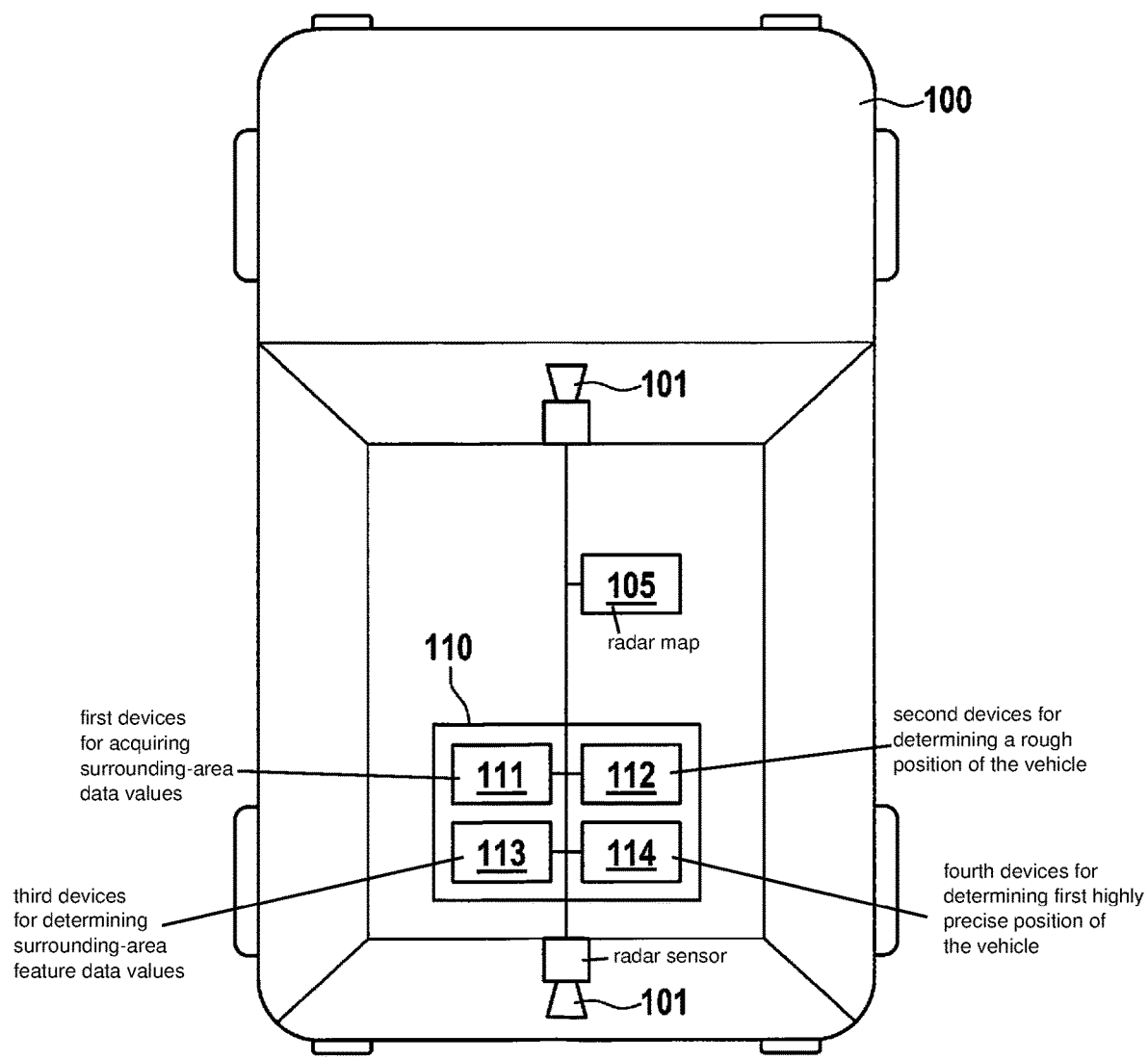
FIG. 1 shows purely illustratively, a vehicle, which includes the example device of the present invention for executing the method of the present invention.

FIG. 1 shows a vehicle 100, which includes an example device 110 for executing a method 300 according to at least one of the method claims.

Device 110 includes first devices 111 for acquiring surrounding-area data values with the aid of at least one radar sensor 101, which is contained by vehicle 101. In this context, first devices 111 are configured to be able to receive the data acquired by radar sensor 101 of vehicle 100, using a connection, for example, a cable. In addition, first devices 111 are configured to evaluate the acquired surrounding-area data values and, for example, to generate a radar image of surrounding area 200 of vehicle 100 on the basis of the acquired surrounding-area data values. For this, first devices 111 include, for example, a first processing unit, which contains a processor, working memory, a storage medium and corresponding software, in order to carry out such an evaluation.

In addition, device 110 includes second devices 112 for determining a rough position 220 of vehicle 100. To that end, second devices 112 include, for example, a second processing unit, which contains a processor, working memory, a storage medium and corresponding software, in order to carry out such a determination. In one further specific embodiment, the first and the second processing units of first devices 111 may also be identical. For example, rough position 220 may be determined by comparing the surrounding-area data values acquired and evaluated by first devices 111 to a first radar signature. These may be present, for example, in the form of a radar map 105, which includes location-specific radar signatures. In this context, radar map 105 may be both contained by second devices 112, and present in vehicle 100 independently of device 110, for example, in a navigation system. Consequently, vehicle 100 is assigned a rough position 220, using a comparison of the surrounding-area data values with the first radar signature. In addition, second devices 112 are connected to first devices 111.

Furthermore, device 110 includes third devices 113 for determining surrounding-area feature data values as a function of determined rough position 220 of vehicle 100; the surrounding-area feature data values representing at least one surrounding-area feature 201 and a second highly precise position 230 of the at least one surrounding-area feature 201. To that end, third devices 113 have, for example, a third processing unit, which includes a processor, working memory, and a database, for example, in a storage medium, together with corresponding software; the database containing surrounding-area features 201 in the form of surrounding-area feature data values, in connection with their respective, second highly precise position 230, as a function of a rough position 220. In this context, for example, rough position 220 is read in by second devices 112, and all surrounding-area features 201 within a predefined distance are selected in the database.

Subsequently, the surrounding-area feature 201 at the shortest distance 202 from the vehicle is selected, and all of the data, which relate to this surrounding-area feature 201, are transmitted to fourth devices 114. In a further specific embodiment, the third processing unit may be identical to the first and/or second processing unit.

In addition, device 110 includes fourth devices 114 for determining 340 first highly precise position 210 of vehicle 100 as a function of the at least one surrounding-area feature 201. To that end, fourth devices 114 include, for example, a fourth processing unit, which contains a processor, working memory, a storage medium and corresponding software, in order to carry out such a determination. In one further specific embodiment, the first and/or the second and/or the third and/or the fourth processing units may also be identical. In this context, first highly precise position 210 of vehicle 100 is determined, for example, by comparing the surrounding-area data values at least partially to a second radar signature, according to predefined, second comparison criteria. Just as in the case of the first radar signature, this may be present in the form of a radar map 105. The comparison with the second radar signature allows the position and/or the direction of movement of vehicle 100 relative to the surrounding-area feature to be determined highly precisely. Using the known, second highly precise position 230 of surrounding-area feature 201 as a starting point, the fourth processing unit may now determine first highly precise position 210 of vehicle 100, for example, using vector addition, by adding the relative position of vehicle 100 to the second highly precise position of surrounding-area feature 201.

Figure 2:
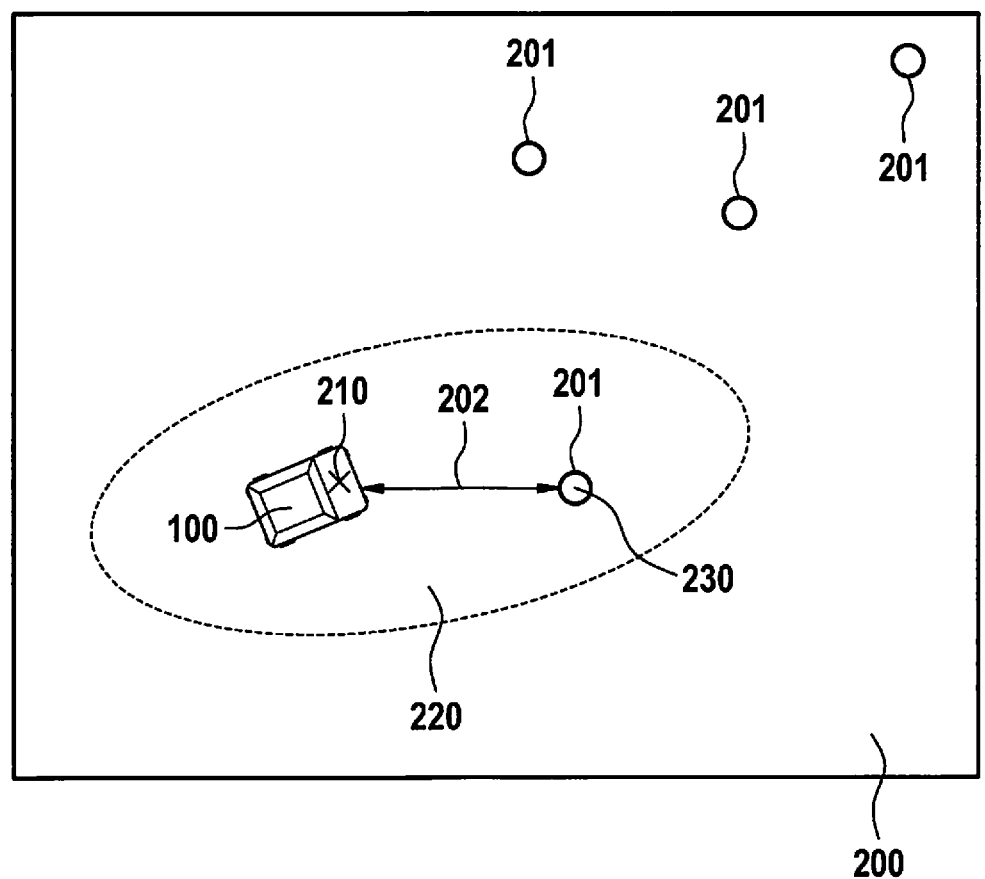
FIG. 2 shows purely illustratively, an exemplary embodiment.

FIG. 2 shows a vehicle 100 and a surrounding area 200 of vehicle 100. In addition, a plurality of surrounding-area features 201 are situated in surrounding area 200. Surrounding-area data values are acquired with the aid of device 110 and at least one radar sensor 101 of vehicle 100. A rough position 220 of the vehicle is determined, using the acquired surrounding-area data values as a starting point. In this case, rough position 220 is shown illustratively as an elliptical surface, in which the vehicle is located. Starting out from rough position 220, surrounding-area features 201 are determined; exactly one surrounding-area feature 201, whose distance 202 from vehicle 100 is minimal, preferably being determined. In addition, second highly precise position 230 of surrounding-area feature 201 is known. Starting out from this second highly precise position 230, first highly precise position 210 of the vehicle is now determined, for example, using distance 202 and/or a direction of movement of vehicle 100 relative to surrounding-area feature 201. For example, the direction of movement may likewise be determined from the acquired surrounding-area data values, since an orientation of vehicle 100 is determined by comparing them to the first and/or second radar signature. In addition, the direction of movement may also be determined with the aid of further sensors, which are contained by vehicle 100.

FIG. 3 shows an exemplary embodiment with the aid of a flow chart.

Example method 300 starts in step 301. This takes place, for example, since a driving function, which is implemented in a control unit for operating vehicle 100, needs a first highly precise position 210 of vehicle 100 and requests this first highly precise position 210 via a corresponding signal to device 110.

In step 310, surrounding-area data values are acquired with the aid of at least one radar sensor 101 of vehicle 100; the surrounding-area data values representing a surrounding area 200 of vehicle 100.

In step 320, a rough position 220 of vehicle 100 is determined as a function of the acquired surrounding-area data values.

In step 330, surrounding-area feature data values are determined as a function of determined rough position 220 of vehicle 100; the surrounding-area feature data values representing at least one surrounding-area feature 201 and a second highly precise position 230 of the at least one surrounding-area feature 201.

In step 340, first highly precise position 210 of vehicle 100 is determined as a function of the at least one surrounding-area feature 201; according to predefined localization criteria, first highly precise position 210 of vehicle 100 being more precise than rough position 220 of vehicle 100.

In step 350, method 300 ends, for example, since device 110 transmits a first highly precise position 210 of vehicle 100 to a control unit, which needs first highly precise position 210 of vehicle 100 for operating vehicle 100.

What is claimed is:

1. A method comprising:
    sensing first information of a surrounding area of a vehicle with a radar sensor of the vehicle;
    comparing the sensed first information of the surrounding area to a first map signature;
    based on a result of the comparison to the first map signature, determining a position of the vehicle at a first precision;
    based on the determined rough position of the vehicle, determining second information of the surrounding area of the vehicle including a position of at least one feature in the surrounding area of the vehicle;
    comparing the determined second information of the surrounding area, including the position of the at least one feature to a second map signature; and
    based on the comparison to the second map signature, determining the position of the vehicle at a second precision that is more precise than the first precision such that the position of the vehicle at the second precision permits operation of the vehicle that is not possible by exclusive determination of the position of the vehicle at the first precision.

2. The method as recited in claim 1, wherein:
    the at least one feature in the surrounding area of the vehicle includes a plurality of featured;
    the method further comprises identifying one of the plurality of features as being nearest, of all of the plurality of features, to the vehicle; and
    the comparison to the second map signature is performed based on the identification of the one of the plurality of features.

3. The method as recited in claim 1, wherein the position of the vehicle at the first precision and/or the position of the at least one feature is defined according to a predefined coordinate system.

4. The method as recited in claim 3, wherein the predefined coordinate system is a GPS coordinate system.

5. The method as recited in claim 1, wherein the position of the vehicle at the second precision is determined using the position of the at least one feature in the surrounding area of the vehicle, which is determined based on the position of the vehicle at the first precision.

6. A device of a vehicle, the device comprising:
a radar sensor; and at least one processor; wherein:
the radar sensor is configured to sense first information of a surrounding area of the vehicle of the vehicle; and
the at least one processor is configured to: compare the sensed first information of the surrounding area to a first map signature;
based on a result of the comparison to the first map signature, determine a position of the vehicle at a first precision;
based on the determined rough position of the vehicle, determine second information of the surrounding area of the vehicle including a position of at least one feature in the surrounding area of the vehicle;
compare the determined second information of the surrounding area, including the position of the at least one feature to a second map signature; and
based on the comparison to the second map signature, determine the position of the vehicle at a second precision that is more precise than the first precision, such that the position of the vehicle at the second precision permits operation of the vehicle that is not possible by exclusive determination of the position of the vehicle at the first precision.

* * * * *